US012660062B2

(12) United States Patent
Veldman et al.

(10) Patent No.: US 12,660,062 B2
(45) Date of Patent: Jun. 16, 2026

(54) DUAL TAPPED L2 SUPPLY CONFIGURATION FOR TLED LAMPS

(71) Applicant: SIGNIFY HOLDING B.V., Eindhoven (NL)

(72) Inventors: Paul Robert Veldman, Oss (NL); Raimundo De Heer Galisteo, Uden (NL); Gaoxian Jin, Shanghai (CN); Siqi Li, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 102 days.

(21) Appl. No.: 18/840,937

(22) PCT Filed: Feb. 16, 2023

(86) PCT No.: PCT/EP2023/053876

§ 371 (c)(1),
(2) Date: Aug. 23, 2024

(87) PCT Pub. No.: WO2023/161116

PCT Pub. Date: Aug. 31, 2023

(65) Prior Publication Data

US 2025/0176082 A1 May 29, 2025

(30) Foreign Application Priority Data

Feb. 24, 2022 (WO) ................ PCT/CN2022/077607
Mar. 29, 2022 (EP) .................................... 22165187

(51) Int. Cl.
*H05B 45/357* (2020.01)
*H05B 45/37* (2020.01)

(52) U.S. Cl.
CPC ........... *H05B 45/357* (2020.01); *H05B 45/37* (2020.01)

(58) Field of Classification Search
None
See application file for complete search history.

(56) References Cited

U.S. PATENT DOCUMENTS 6,072,280 A * 6/2000 Allen ..................... H05B 45/00 315/192
8,710,754 B2 * 4/2014 Baddela ............. H05B 45/3577 315/192

(Continued)

FOREIGN PATENT DOCUMENTS

CN 107409454 A 11/2017
CN 109475090 A 3/2019

(Continued)

*Primary Examiner* — Srinivas Sathiraju

(57) ABSTRACT

The invention relates to a retrofit Light Emitting Diode, LED, lighting device for connecting to a fluorescent ballast, wherein the retrofit LED lighting device comprises a first end comprising a first power connection and a second power connection for receiving an output power from the fluorescent ballast and comprising a first relay, wherein the first power connection and the second power connection are coupled to a first single connector, wherein the first end is adapted to provide a first output and a second output, a second end comprising a third power connection and a fourth power connection for receiving an output power of the fluorescent ballast and comprising a second relay, wherein the third power connection and the fourth power connection are coupled to a second single connector, wherein the second end is adapted to provide a third output and a fourth output, wherein the first output is coupled to the third output and the second output is coupled to the fourth output, a light emitting diode, LED, load comprising a first set of one or more LEDs coupled to the first output and a second set of one or more LEDs coupled to the second output, wherein the first set of one or more LEDs and the second set of one or more LEDs are coupled in series, (Continued)

wherein the retrofit LED lighting device further comprises the first relay comprising a first relay switch and a first driving coil circuit, wherein the first relay switch is in a series connection between the first power connection or the second power connection and the LED load, and the second relay comprising a third relay switch and a second driving coil circuit, wherein the second relay switch is coupled between the third power connection or the fourth power connection and the LED load, wherein the first driving coil circuit is electrically coupled across the first set of one or more LEDs and the second driving coil circuit is electrically coupled across the second set of one or more LEDs.

13 Claims, 5 Drawing Sheets

(56) References Cited

U.S. PATENT DOCUMENTS

| | | | | |
|---|---|---|---|---|
| 9,243,757 | B2 * | 1/2016 | Barnetson | F21K 9/23 |
| 9,341,359 | B1 * | 5/2016 | Fernandez | H05B 47/199 |
| 9,351,357 | B2 * | 5/2016 | Tao | H05B 47/26 |
| 9,468,054 | B2 * | 10/2016 | Barnetson | H05B 45/37 |
| 9,661,703 | B1 * | 5/2017 | Fernandez | H05B 47/199 |
| 10,051,704 | B2 * | 8/2018 | Linnartz | H05B 45/382 |
| 10,153,692 | B2 * | 12/2018 | Brnada | H05B 45/36 |
| 10,638,564 | B2 * | 4/2020 | Haimin | H05B 41/38 |
| 10,667,361 | B2 * | 5/2020 | Roy | H05B 45/14 |
| 11,057,973 | B2 * | 7/2021 | De Jongh | H05B 45/37 |
| 11,118,773 | B2 * | 9/2021 | Zhang | H05B 47/26 |
| 11,229,101 | B2 * | 1/2022 | Long | H05B 45/395 |
| 11,483,911 | B2 * | 10/2022 | Tao | H05B 45/345 |
| 12,069,782 | B2 * | 8/2024 | Lin | H05B 45/345 |
| 2003/0102810 | A1 * | 6/2003 | Cross | F21K 9/27<br>315/74 |
| 2005/0023536 | A1 * | 2/2005 | Shackle | H05B 45/12<br>257/79 |
| 2007/0228999 | A1 * | 10/2007 | Kit | H05B 45/10<br>315/291 |
| 2008/0094837 | A1 * | 4/2008 | Dobbins | G07F 9/10<br>362/249.01 |
| 2008/0158871 | A1 * | 7/2008 | McAvoy | H05B 45/22<br>362/227 |
| 2010/0289428 | A1 * | 11/2010 | Frazier | H05B 45/3578<br>29/401.1 |
| 2011/0043136 | A1 | 2/2011 | Radermacher | |
| 2011/0309757 | A1 * | 12/2011 | Weaver | H05B 45/24<br>315/188 |
| 2013/0063035 | A1 * | 3/2013 | Baddela | H05B 45/3577<br>315/192 |
| 2014/0192526 | A1 | 7/2014 | Qiu | |
| 2015/0009701 | A1 * | 1/2015 | Bako | F21K 9/23<br>362/382 |
| 2015/0241000 | A1 * | 8/2015 | Barnetson | F21K 9/65<br>362/294 |
| 2015/0245430 | A1 * | 8/2015 | Tao | H05B 45/40<br>315/200 R |
| 2016/0134188 | A1 * | 5/2016 | Brnada | H02M 3/156<br>315/294 |
| 2017/0086277 | A1 * | 3/2017 | Kim | H05B 45/22 |
| 2017/0290117 | A1 * | 10/2017 | Linnartz | H05B 45/10 |
| 2018/0128427 | A1 * | 5/2018 | Barnetson | H01R 33/945 |
| 2019/0150238 | A1 * | 5/2019 | Shounak | H05B 45/14<br>315/191 |
| 2019/0208593 | A1 * | 7/2019 | Haimin | H05B 41/38 |
| 2020/0015329 | A1 * | 1/2020 | Cvoric | H05B 45/00 |
| 2020/0217480 | A1 * | 7/2020 | Barnetson | H01R 33/74 |
| 2021/0136893 | A1 * | 5/2021 | De Jongh | H05B 45/3578 |
| 2021/0176838 | A1 * | 6/2021 | Long | H05B 45/395 |
| 2022/0007481 | A1 * | 1/2022 | Tao | H05B 45/50 |
| 2023/0120486 | A1 * | 4/2023 | Lin | H05B 45/3574<br>315/53 |
| 2024/0121871 | A1 * | 4/2024 | Qing | H05B 45/59 |
| 2025/0138765 | A1 * | 5/2025 | Li | G06F 3/14 |
| 2025/0176082 | A1 * | 5/2025 | Veldman | H05B 45/37 |

FOREIGN PATENT DOCUMENTS

| | | | |
|---|---|---|---|
| CN | 112369125 | A | 2/2021 |
| EP | 2381159 | A2 | 10/2011 |
| EP | 3562271 | A1 | 10/2019 |
| JP | 5503164 | B2 | 5/2014 |

* cited by examiner

DUAL TAPPED L2 SUPPLY CONFIGURATION FOR TLED LAMPS

CROSS-REFERENCE TO PRIOR APPLICATIONS

This application is the U.S. National Phase application under 35 U.S.C. § 371 of International Application No. PCT/EP2023/053876, filed on Feb. 16, 2023, which claims the benefit of International Application No. PCT/CN2022/077607, filed on Feb. 24, 2022 and European patent application Ser. No. 22165187.0, filed on Mar. 29, 2022. These applications are hereby incorporated by reference herein.

FIELD OF THE INVENTION

The invention relates to retrofit Light Emitting Diode, LED, lighting device.

BACKGROUND OF THE INVENTION

Fluorescent retrofittable light emitting diode (LED) lamps may comprise a relay on the driver board at either end of the lamp. The relay may for example provide a pin safety function that is used to prevent, during installation of the lamp in the socket, a voltage to be present from one end of the lamp to the other end of the lamp. The driving coil of each relay needs to be energized for the relay to be activated, e.g. closed for a normal-open relay. FIG. 1 shows how currently the driving coils of the relays in fluorescent retrofittable LED lamps are powered. A buck converter is used to transform the voltage across the LEDs, LED+, to a lower voltage such that it conforms the voltage required for driving the driving coil. In this example, the buck converter is located at one end of the fluorescent retrofittable LED lamp and its output is routed via the LED board to the relay at a driver board at a second end of the fluorescent retrofittable LED lamp, thus requiring an additional connection, next to the positive supply LED+ and the negative supply LED−, between each of the driver boards 1, 3 and the LED board 2. In a fluorescent retrofittable LED lamp, the first driver board 1 is located on one end of the fluorescent retrofittable LED lamp, preferably in the first end, and the second driver 3 is located on the opposite end of the fluorescent retrofittable LED lamp, preferably in the second end.

Another major drawback of the use of a buck converter, or any kind of switched mode power supply, SMPS, is that the converter generally exhibits a negative differential input impedance at its input terminals. The input current increases as the input voltage decreases, which can create problems in distinct operating conditions as it may cause unintended oscillations.

It is therefore desired to provide a solution that is easier and more reliable.

SUMMARY OF THE INVENTION

It is an objective of the invention to provide a retrofit Light Emitting Diode, LED, lighting device that provides a simple driving of the relay.

To provide this simple driving of the relay, in a first aspect of the invention a retrofittable Light Emitting Diode, LED, lighting device for connecting to a fluorescent ballast is provided wherein said retrofit LED lighting device comprises:

- a first end comprising a first power connection and a second power connection for receiving an output power from the fluorescent ballast and comprising a first relay, wherein the first power connection and the second power connection are coupled to a first single connector, wherein the first end is adapted to provide a first output and a second output;
- a second end comprising a third power connection and a fourth power connection for receiving an output power of the fluorescent ballast and comprising a second relay, wherein the third power connection and the fourth power connection are coupled to a second single connector, wherein the second end is adapted to provide a third output and a fourth output, wherein the first output is coupled to the third output and the second output is coupled to the fourth output;
- a light emitting diode, LED, load comprising:
  - a first set of one or more LEDs coupled to the first output; and
  - a second set of one or more LEDs coupled to the second output, wherein the first set of one or more LEDs and the second set of one or more LEDs are coupled in series; wherein the retrofit LED lighting device further comprises:
    - the first relay comprising a first relay switch and a first driving coil circuit, wherein the first relay switch is in a series connection between the first power connection or the second power connection and the LED load; and
    - the second relay comprising a third relay switch and a second driving coil circuit, wherein the second relay switch is coupled between the third power connection (in3) or the fourth power connection and the LED load, wherein the first driving coil circuit is electrically coupled across the first set of one or more LEDs and the second driving coil circuit is electrically coupled across the second set of one or more LEDs.

The first relay is preferably positioned in the first end, where most space is available for a relay. The first end receives an input power from the fluorescent ballast via a first single connector. From the first end, a first output and a second output are provided to at least a first set of one or more LEDs and a second set of series LEDs. The driving coil of the first relay is coupled across the first set of one or more LEDs. This means that the driving coil is coupled to the first output and a corresponding other node of the first set of one or more LEDs such that the driving coil is effectively in parallel with the first set of one or more LEDs.

The retrofit LED lighting device has a second end. The retrofit LED lighting device may then be an elongated lighting tube having two opposite ends where the corresponding first and second ends are located. Additionally, a second relay is provided that is used to switch the third power connection or the fourth power connection to the LED load. The driving coil of the second relay is coupled in a similar fashion as the driving coil of the first relay: the driving coil of the first relay is electrically coupled across the first set of one or more LEDs and the driving coil of the second relay is electrically coupled across the second set of one or more LEDs. The two driving coils are effectively coupled in series with each other and in parallel to different LEDs. This retrofit LED lighting device allows a simple drive of the relays being realized without having a large impact on the light output.

This retrofit LED lighting device provides a simple and reliable way of providing a small current to the driving coil for a relay that is used in the retrofit LED lighting device. In addition, because a switched mode power supply is not required for powering the driving coil, the effect of the negative differential impedance at the input terminals of the switched mode power supply is also not present.

In a further example, the first driving coil circuit comprises a parallel combination of a first capacitor and a first resistor.

The introduction of the parallel combination of the first capacitor and the first resistor allows a high drive current, via the first capacitor, to be provided to the driving coil during the closing of the relay and a weaker drive current, via the first resistor, to be provided to the driving coil once the relay is closed.

In a further example, a forward voltage of the first set of one or more LEDs is matched with a required driving voltage of the first driving coil circuit by providing an amount of series coupled LEDs of the LEDs of the first set of one or more LEDs to provide a forward voltage being equal to or larger than the required driving voltage of the first driving coil circuit.

When the forward voltage of the LEDs to which the driving coil circuit is placed in parallel is equal to or larger than the drive voltage of the driving coil circuit, the relay switch can close properly. Preferably, the LED forward voltage is selected to be slightly above the required drive voltage so that the LED forward voltage approximates the drive voltage.

In a further example, a rectifier circuit is coupled between the first power connection and the second power connection and the first output and the second output.

Providing the rectifier circuit between the first power connection, the second power connection, the first output and the second output allows the alternating current, AC, input to be rectified and allow a simple control of the current through the LED load preferably a current limiter which can be placed in series with the LED load if e.g. dimming is required. The rectifier circuit provides a first power connection that may provide a first positive voltage to the LED load and a second power connection that provides a return path.

In a further example, the first relay switch is coupled between the first power connection or the second power connection and the rectifier circuit.

Coupling the first relay switch in the path between the first end and the input of the rectifier circuit allows the first relay to disconnect the retrofit LED lighting device completely from the ballast. The relay switch can be placed such that no components can provide a leakage path between the first power connection and the second power connection, which may otherwise lead to losses when the retrofit LED lighting device is in stand-by, which may mean that the retrofit LED lighting device does not generate light.

In a further example, the first relay comprises a second relay switch, wherein the first relay switch is coupled between the first power connection and the rectifier circuit and the second relay switch is coupled between the second power connection and the rectifier circuit.

The relay can be a relay that has two relay switches that are controlled by the same driving coil. The relay can then be used to completely disconnect the LED load from the first power connection and the second power connection. The relay with two relay switches can also provide further benefits such as automatically switching between a pin safety function and a filament emulation function. This function will be described in more details in the detailed description.

In another example, the retrofit LED lighting device further comprises:

- a second end comprising a third power connection and a fourth power connection for receiving an output power of the fluorescent ballast and comprising a second relay, wherein the third power connection and the fourth power connection are coupled to a second single connector, wherein the second end is adapted to provide the third output and the fourth output, wherein the first output is coupled to the third output and the second output is coupled to the fourth output; and
- a second relay comprising a third relay switch and a second driving coil circuit, wherein the second relay switch is coupled between the third power connection and the rectifier circuit or between the fourth power connection and the LED load;

wherein the first driving coil circuit is electrically coupled across the first set of one or more LEDs and the second driving coil circuit is electrically coupled across the second set of one or more LEDs.

In another example, the second driving coil circuit comprises a parallel combination of a second capacitor and a second resistor.

Similar as explained for the first driving coil, the introduction of the parallel combination of the second capacitor and the second resistor allows a high drive current, via the second capacitor, to be provided to the driving coil of the second relay during the closing of the second relay and a weaker drive current, via the second resistor, to be provided to the driving coil once the second relay is closed.

In another example, a forward voltage of the first set of one or more LEDs is matched with a driving voltage of the first driving coil circuit by providing an amount of LEDs of the first set of one or more LEDs to provide a forward voltage being equal to or larger than the driving voltage of the first driving coil circuit and wherein a forward voltage of the second set of one or more LEDs is matched with a driving voltage of the second driving coil circuit by providing an amount of LEDs of the second set of one or more LEDs to provide a forward voltage being equal to or larger than the driving voltage of the second driving coil circuit.

The forward voltage of the first set of one or more LEDs is matched with a driving voltage of the first driving coil of the first relay. The forward voltage of the second set of one or more LEDs is matched with a driving voltage of the second driving coil of the second relay. This allows the first relay and the second relay to be closed properly. Preferably, the LED forward voltage of the first set of one or more LEDs and the forward voltage of the second set of one or more LEDs is selected to be slightly above the required drive voltage of the respective first relay coil and second relay coil so that the LED forward voltages approximate the drive voltages.

In another example, the first relay switch and the third relay switch are closed upon detection of a presence of a voltage and/or current at the first end and at the second end.

A function of the relays is pin safety. Relays may be used as a safety device since they have an internal creepage that may provide electric safety. The relay switches are connected electrically between the first end of the retrofit LED lighting device and the second end. This means that the relay may be used to prevent a voltage on one end to be present at the other end. Preferably, two relays are used to provide a redundancy for safety.

In another example, the first relay comprises a second relay switch, wherein the first relay switch is coupled between the first power connection and the LED load and the second relay switch is coupled between the second power connection and the LED load and wherein the second relay comprises a fourth relay switch, wherein the third relay switch is coupled between the third power connection and the LED load and the fourth relay switch is coupled between the fourth power connection and the LED load.

Both relays can be relays that have two relay switches that are controlled by the same corresponding driving coil. The relays can then be used to completely disconnect the LED load from the first power connection, the second power connection, the third power connection and the fourth power connection. The relay with two relay switches can also provide further benefits such as automatically switching between a pin safety function and a filament emulation function. This function will be described in more details in the detailed description.

In another example, the first relay switch is adapted to be closed when a proper insertion of the retrofit LED lighting device in a retrofittable luminaire is detected.

In another example, the first set of one or more LEDs and/or the second set of one or more LEDs are evenly distributed between the first end and the second end.

The first set of one or more LEDs and/or the second set of one or more LEDs may suffer from a reduced light output because of the diverted current to the driving coils. Distributing the LEDs over the length of the retrofit LED lighting device i.e. between the two ends, the effect can be mitigated since there will be no difference, or dark spots, in light visible over the length of the retrofit LED lighting device since the overall light output of the retrofit LED lighting device.

In another example, the retrofit LED lighting device comprises a third set of one or more LEDs coupled between the first set of one or more LEDs and the second set of one or more LEDs, wherein an LED density of the first set of one or more LEDs is higher than an LED density of the third set of one or more LEDs and/or an LED density of the second set of one or more LEDs is higher than an LED density of the third set of one or more LEDs.

The first set of series coupled LEDs and/or the second set of series coupled LEDs may suffer from a reduced light output because of the diverted current to the driving coils. When a third set of series coupled LEDs is not suffering from a diverted current through the driving coil, there will be a discrepancy of light output between the first set of series coupled LEDs and/or the second set of series coupled LEDs and the third set of series coupled LEDs. The LEDs that emit the least light can be placed closer together as to increase the LED density. This difference in density between allows the first set of series coupled LEDs and/or the second set of series coupled LEDs and the third set of series coupled LEDs allows an even light distribution along the entire length of the retrofit LED lighting device i.e. between the two ends.

BRIEF DESCRIPTION OF THE DRAWINGS

Examples of the invention will now be described with reference to the accompanying drawings, in which.

DETAILED DESCRIPTION OF THE EMBODIMENTS

Figure 1:
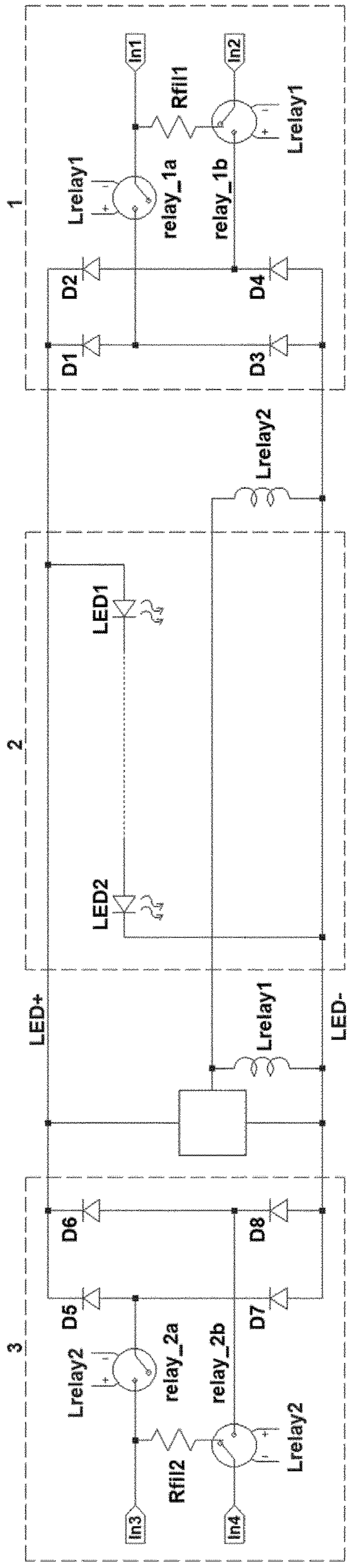
FIG. 1 shows an example of a circuit diagram of a commonly known fluorescent retrofittable LED lamp.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should also be understood that the Figures are merely schematic and are not drawn to scale. It should also be understood that the same reference numerals are used throughout the Figures to indicate the same or similar parts.

Figure 2:
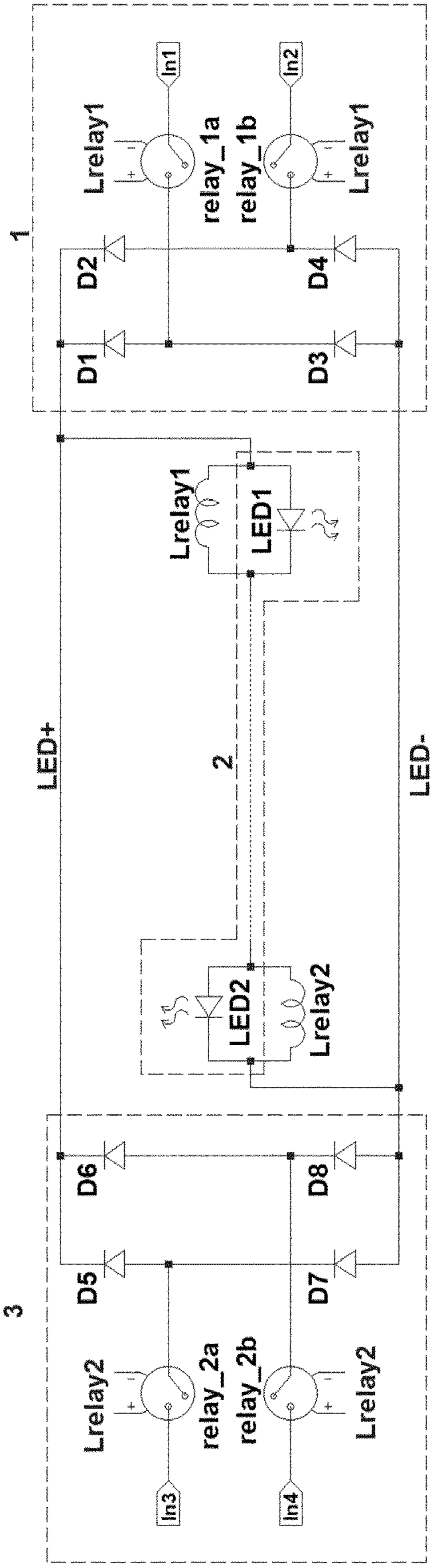
FIG. 2 shows an example of a circuit diagram of a fluorescent retrofittable LED lamp according to the invention.

FIG. 2 show an example of a circuit diagram of a fluorescent retrofittable LED lamp. The fluorescent retrofittable LED lamp may be connected to a fluorescent ballast. The ballast may be any type of commonly used ballast, such as an electromagnetic ballast or a high frequency ballast. The fluorescent retrofittable LED lamp has a first end 1 and a second end 3 located at a respective first end and second end of the fluorescent retrofittable LED lamp. The ends are at opposite ends of the fluorescent retrofittable LED lamp. Each end has a single connector allowing the fluorescent retrofittable LED lamp to be inserted in a conventional fluorescent troffer. A single connector may be a bi-pin connector such as used by fluorescent tubes to fit into a tombstone style lamp holder. By the introduction of electronics, instead of a gas which can discharge, inside the fluorescent retrofittable LED lamp providing an electric connection between the first end 1 and the second end 3, a voltage that is present at one single connector may also be available at the other single connector. This may cause a hazardous situation for an installer of the fluorescent retrofittable LED lamp into the troffer because the installer may be able to touch the single connector that is not inserted yet and be exposed to a potential hazardous voltage. A pin safety circuit is in this situation provided and allows an interruption of the electric connection between the two ends. This may be normally done using a relay because a relay is considered a safety device, the relay is placed in the electric connection between the two ends. The relay switch is in an open position when the fluorescent retrofittable LED lamp is not powered. When the fluorescent retrofittable LED lamp is inserted, the relay will only close when both ends are inserted properly into the troffer, such that the installer cannot reach any of the Pins.

In the example provided, the first relay Relay1 has a first relay switch relay_1*a* and a second relay switch relay_1*b* that are controlled via driving coil Lrelay1. In this example, the second relay relay2 has a third relay switch relay_2*a* and a fourth relay switch relay_2*b* that are controlled via driving coil Lrelay2. In the example provided, the switches of first relay Relay1 and second relay Relay2 are both placed in the electric connection between the two ends.

The first end 1 may have a first power connection in1 and a second power connection in2. At these inputs, an output of the fluorescent ballast may be connected. The first relay Relay1 may be comprised in the first end 1. The first power connection in1 and the second power connection in2 are coupled to the first single connector.

The fluorescent retrofittable LED lamp may have a second end 3 that may have a third power connection in3 and a fourth power connection in4. At these inputs, another output of the fluorescent ballast may be connected. The second relay relay2 may be comprised in the second end 2.

The fluorescent retrofittable LED lamp has a light emitting diode, LED, load 2. The LED load 2 has a first set of one or more LEDs LED1. This first set of one or more LEDs LED1 may comprise one LED or multiple LEDs arranged in a series and/or parallel combination. Preferably, the LEDs have the same color output.

Across the first set of one or more LEDs LED1, the first driving coil circuit Lrelay1 is connected. In this example, the first driving coil circuit Lrelay1 is the first driving coil Lrelay1. The voltage across the first set of one or more LEDs LED1 is therefore also present across the first driving coil Lrelay1. If the voltage across the first set of one or more LEDs LED1 exceeds the voltage needed for driving the first driving coil Lrelay1, the first relay Relay1 can be operated reliably. It is therefore desired that the forward voltage of the first set of one or more LEDs LED1 is matched with the voltage required for reliably operating the first driving coil Lrelay1. This matching is done by providing in the first set of one or more LEDs LED1 a series connection of LEDs that provide a forward voltage equal to or larger than the required driving voltage of the first driving coil Lrelay1. Preferably, when the forward voltage is larger than the required driving voltage of the first driving coil Lrelay1, the forward voltage is kept close to the required driving voltage to prevent additional power losses. In the example provided, a relay may be chosen that requires a driving voltage that is equal to the forward voltage of a single LED. Alternatively, the required driving voltage may correspond to an integer amount of series connected LEDs. In this situation, the amount of LEDs in series may provide a forward voltage that is equal to or larger than the required driving voltage of the first driving coil Lrelay1.

A rectifier circuit may be provided to provide a rectified voltage to the LED load 2. The rectifier circuit may be part of the first end 1. The rectifier circuit is coupled between the first power connection in1 and the second power connection in2 and the first output LED+ and the second output LED−. The rectifier receives an alternating current, AC, voltage and rectifies this voltage to a direct current, DC, voltage which is represented in the figure as the first output LED+ and the second output LED−. The relay may start up by having a power source not shown in the figure to power the first driving coil Lrelay1 such that the first relay switch relay_1 is closed. A power will then flow to the LED load 2 and the first driving coil Lrelay1. Such a start-up maybe provided for example be an energy storage such as a battery or a capacitive coupling between the ends, allowing a small amount of power to be harvested for powering the first driving coil Lrelay1.

Optionally, the retrofittable LED lighting device as shown in FIG. 2 may have a second relay Relay2. An additional rectifier circuit is provided that is coupled between the third power connection in3 and the fourth power connection in4 and the first output LED+ and the second output LED−. The second relay Relay2 may be part of the second end. The LED load 2 has a second set of one or more LEDs LED2. Across the second set of one or more LEDs, the second driving coil circuit Lrelay2 is connected. In this example, the second driving coil circuit Lrelay2 is the second driving coil Lrelay2.

If the voltage across the second set of one or more LEDs LED2 exceeds the voltage needed for driving the second driving coil Lrelay2, the second relay Relay2 can be operated reliably. It is therefore desired that the forward voltage of the second set of one or more LEDs LED2 is matched with the voltage required for reliably operating the second driving coil Lrelay2. This matching is done by providing in the second set of one or more LEDs LED2 a series connection of LEDs that provide a forward voltage equal to or larger than the required driving voltage of the second driving coil Lrelay2. Preferably, when the forward voltage is larger than the required driving voltage of the second driving coil Lrelay2, the forward voltage is kept close to the required driving voltage to prevent additional power losses. In the example provided, a relay may be chosen that requires a driving voltage that is equal to the forward voltage of a single LED. Alternatively, the required driving voltage may correspond to an integer amount of series connected LEDs. In this situation, the amount of LEDs in series may provide a forward voltage that is equal to or larger than the required driving voltage of the second driving coil Lrelay2.

In the example provided, the first relay Relay1 and/or the second relay Relay2 are placed such that they can provide a pin safety functionality. The first relay Relay1 and/or the second relay Relay2 may then only close when a voltage is present at the first end 1 and the second end 3. This means that the retrofittable LED lighting device has been inserted properly in the housing e.g. troffer.

Figure 3:
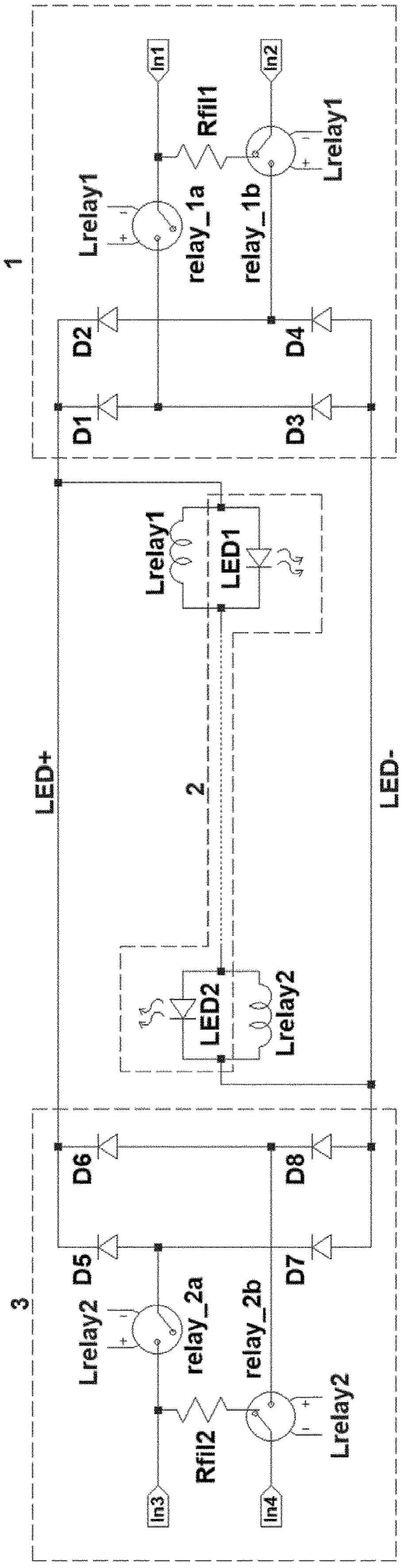
FIG. 3 shows a further example of a circuit diagram of a fluorescent retrofittable LED lamp according to the invention.

In FIG. 3, a further example of a retrofittable LED lighting device is provided. The relay switches are located similarly as in the example of FIG. 3, in the AC path. The first relay switch relay_1*a* may be a single throw (normally-open) switch or the normally-open switch of a double throw relay. The second relay switch relay_1*b* may be a double throw (change-over) switch. The first relay switch relay_1*a* may be used to close upon the detection of a proper insertion of the retrofittable LED lighting device in the troffer and may therefore be used for the pin-safety functionality. The second relay switch relay_1*b* may be used for two functions. In the non-activated state, the second relay switch relay_1*b* is used to couple a first filament element Rfil1 to the second power connection in2, via its normally closed contact. The first filament element Rfil1 is further connected to the first power connection in1. In this non-activated state, the second relay switch relay_1*b* provides a filament emulation function, allowing the fluorescent ballast to detect a filament impedance presence at the first end 1. When the second relay switch relay_1*b* enters the activated state, the first filament element Rfil1 is disconnected from the second power connection in2. In the activated state, the second relay switch relay_1*b* connects the second power connection in2 to an input of the rectifier circuit, via its normally open contact. The second relay switch relay_1*b* closes simultaneously with the first relay switch relay_1*a*, providing an optimized pin safety functionality.

The second relay may be a similar type as the first relay. In this example, the third relay switch relay_2*a* may be a single throw (normally-open) switch or the normally-open switch of a double throw relay. The fourth relay switch relay_2*b* may be a double throw (change-over) switch. The third relay switch relay_2*a* may be used to close upon the detection of a proper insertion of the retrofittable LED lighting device in the troffer and may therefore be used for the pin-safety functionality. The fourth relay switch relay_2*b* may be used for two functions. In the normally open state, the fourth relay switch relay_2*b* is used to couple a second filament element Rfil2 to the fourth power connection in4, via its normally closed contact. The second filament element Rfil2 is further connected to the third power connection in3. In the non-activated state of the second relay, the fourth relay switch relay_2*b* provides a filament emulation function, allowing the fluorescent ballast to detect a filament impedance presence at the second end 3. When the fourth relay switch relay_2*b* enters the activated state, the second filament element Rfil2 is disconnected from the fourth power connection in4. and connects the fourth power connection in4 to an input of the rectifier circuit, via its normally open contact. The fourth relay switch relay_2*b* closes simultaneously with the third relay switch relay_2*a*, providing an optimized pin safety functionality. Preferably, the first relay and the second relay switch both switch simultaneously.

Figure 4:
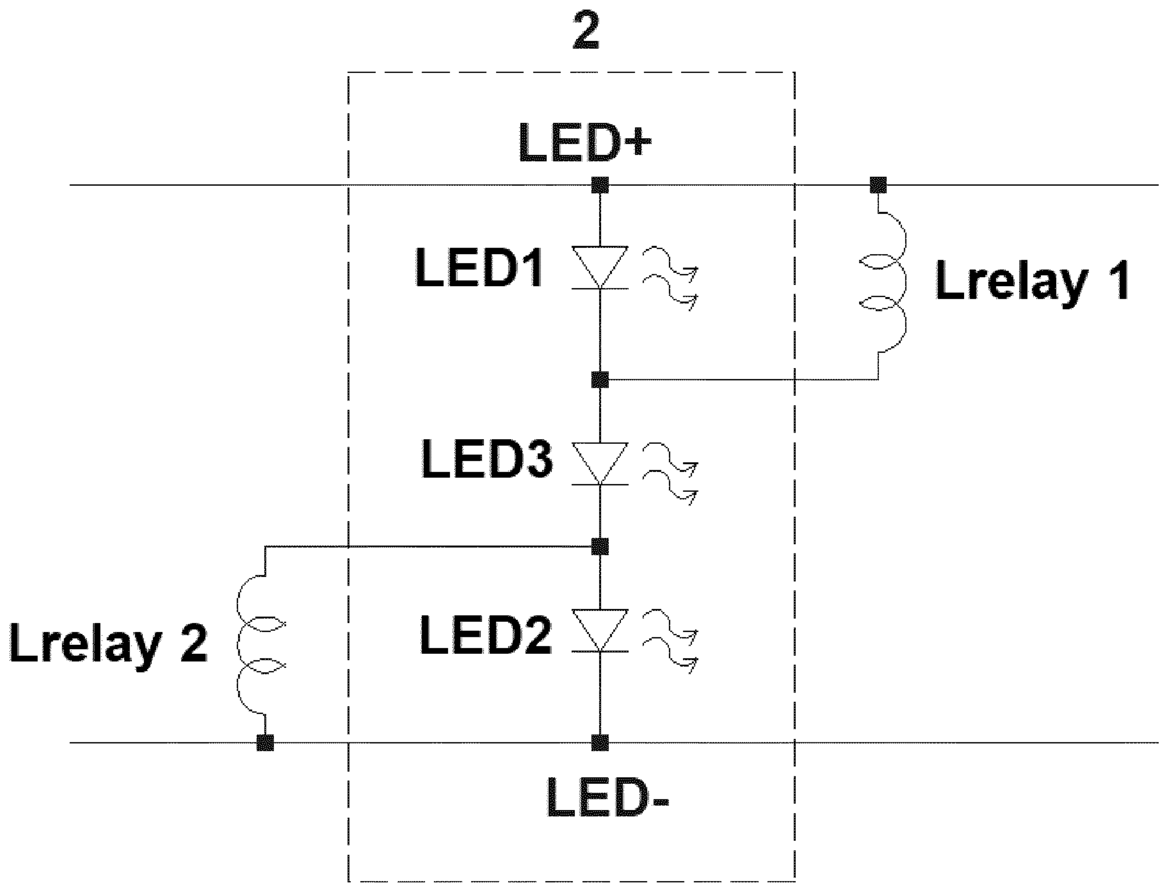
FIG. 4 shows an example of the connections between the LED load and the driving coils of the relays according to the invention.

FIG. 4 shows an example of the LED load 2. The LED load 2 may have the first set of one or more LEDs LED1 coupled to the first output and the second set of one or more LEDs LED2 coupled to the second output. A third set of one or more LEDs LED3 may be coupled in between the first set of one or more LEDs LED1 and the second set of one or more LEDs LED2. Across the third set of one or more LEDs LED3, no driving coil is connected.

Figure 5:
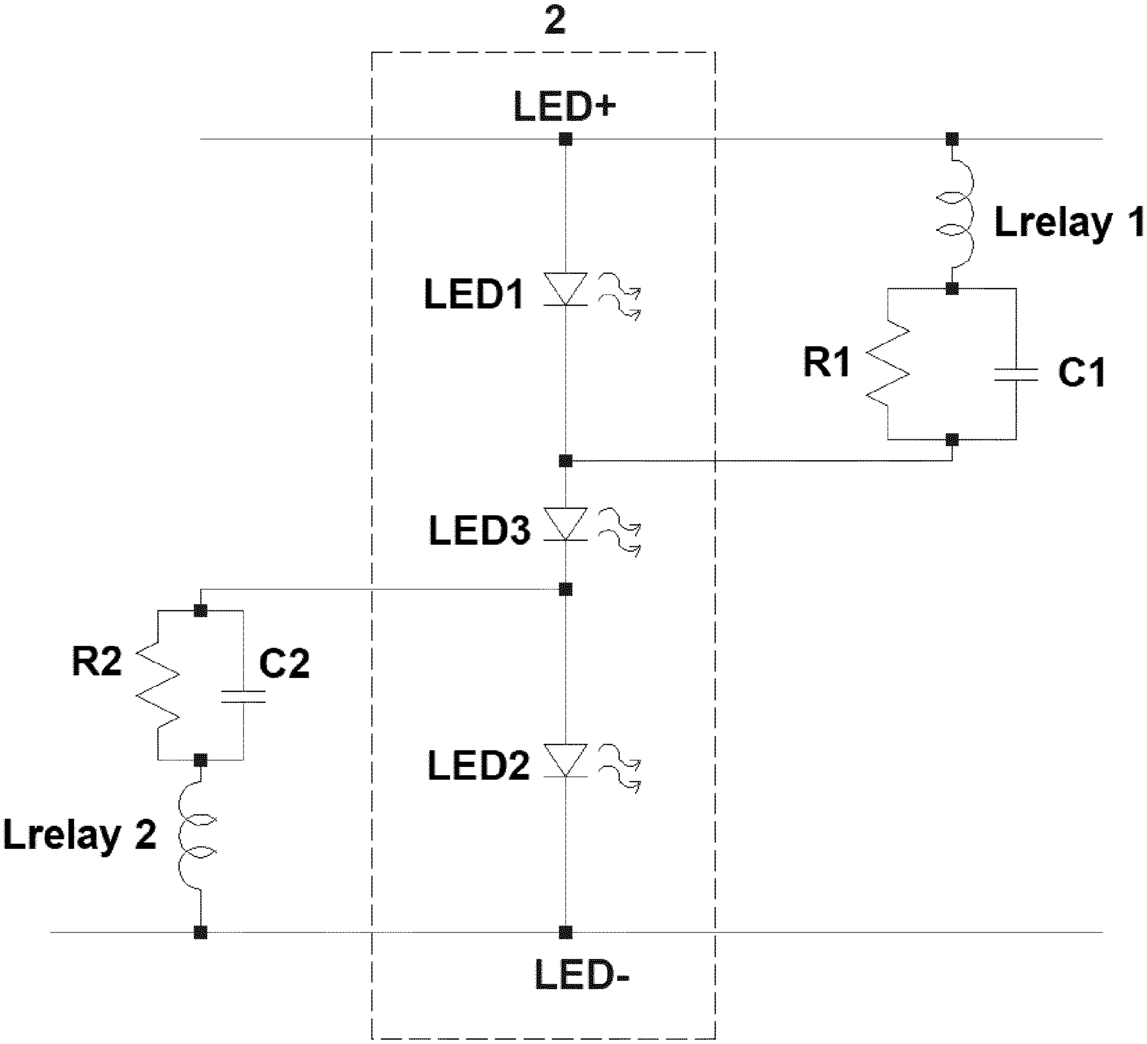
FIG. 5 shows a further example of the connections between the LED load and the driving coils of the relays according to the invention.

FIG. 5 shows another example of the LED load 2. Across the first set of one or more LEDs LED1, the first driving coil circuit is connected. Across the second set of one or more LEDs LED2, the second driving coil circuit is connected. In the example, the first driving coil circuit has the first driving coil Lrelay1 in series with a parallel combination of a first resistor R1 and a first capacitor C1. The second driving coil circuit has the second driving coil Lrelay2 in series with a parallel combination of a second resistor R2 and a second capacitor C2. The capacitor combined with the resistor is used to provide an AC path for the driving coil current to flow. This is especially useful during the closing of the relay switch when a larger current is required. When the relay switch has switched, less current is needed and the current through the driving coil stabilizes. This means that only current via the resistor is provided to the driving coil.

In the examples provided, the LED load is directly coupled to the bus voltage LED+ and LED−. Alternatively, the LEDS may be powered by an SMPS, which uses the bus voltage LED+ and converts it into a current suitable for powering the LED load. Instead of an SMPS, a linear current regulator can be placed in series with the LED load. The linear current regulator may then regulate the current through the LED load. When coupled to a high frequency fluorescent ballast, the retrofit LED lighting device may not need an SMPS.

In the examples provided, the relays may be relays that need to remain the driving coil powered to maintain a position of the relay switch. The moment the driving coil is not powered, the relay switch returns to its starting position. Another example of a relay may be a latching relay. When the driving coil is powered, the relay switches changes position and remains at this position. When the driving coil is not powered anymore, the relay switch still remains in its last position. In the example of a latching relay, additional circuitry can be provided in the driving coil circuit to enable the proper control of the driving coil.

In the example provided, the sets of one or more LEDs are all coupled in series electrically. This however does not limit to the distribution of the LEDs across the printed circuit board, PCB, on which the LEDs are mounted. Because some current may be diverted from the first set of one or more LEDs LED1 and/or the second set of one or more LEDs LED2, these LEDs will provide a lower light output. The LEDs of the first set of one or more LEDs LED1 and/or the second set of one or more LEDs LED may be distributed evenly between the first end 1 and the second end 3. This allows the reduced light output of the LEDs to be evenly distributed among the length of the retrofittable LED lighting device. A user may then perceive no difference in light output.

Another option is to change the LED density of the first set of one or more LEDs LED1 and/or the LED density of the second set of one or more LEDs LED2 with respect to the third set of one or more LEDs LED3. The LED density of the first set of one or more LEDs LED1 and/or the LED density of the second set of one or more LEDs LED2 is higher than the LED density of the third set of one or more LEDs LED3. The increase of the LED density provides a compensation for the reduced light output of the LEDs. The user will then less easily perceive difference in light intensity between the sets of one or more LEDs.

Preferably, the first driving coil circuit Lrelay1 is electrically coupled in parallel to the first set of one or more LEDs LED1 and the second driving coil circuit Lrelay2 is electrically coupled in parallel to the second set of one or more LEDs LED2. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A retrofit Light Emitting Diode, LED, lighting device for connecting to a fluorescent ballast, wherein the retrofit LED lighting device comprises:

a first end comprising a first power connection and a second power connection for receiving an output power from the fluorescent ballast and comprising a first relay, wherein the first power connection and the second power connection are coupled to a first single connector, wherein the first end is adapted to provide a first output and a second output;

a second end comprising a third power connection and a fourth power connection for receiving an output power of the fluorescent ballast and comprising a second relay, wherein the third power connection and the fourth power connection are coupled to a second single connector, wherein the second end is adapted to provide a third output and a fourth output, wherein the first output is coupled to the third output and the second output is coupled to the fourth output;

a light emitting diode, LED, load comprising:

a first set of one or more LEDs coupled to the first output; and a second set of one or more LEDs coupled to the second output, wherein the first set of one or more LEDs and the second set of one or more LEDs are coupled in series; wherein the retrofit LED lighting device further comprises:

the first relay comprising a first relay switch and a first driving coil circuit, wherein the first relay switch is coupled between the first power connection or the second power connection and the LED load, and the second relay comprising a third relay switch and a second driving coil circuit, wherein the third relay switch is coupled between the third power connection or the fourth power connection and the LED load, wherein the first driving coil circuit is electrically coupled in parallel to the first set of one or more LEDs and the second driving coil circuit is electrically coupled in parallel to the second set of one or more LEDs.

2. The retrofittable LED lighting device according to claim 1, wherein the first driving coil circuit comprises a parallel combination of a first capacitor and a first resistor.

3. The retrofittable LED lighting device according to claim 1, wherein a forward voltage of the first set of one or more LEDs is matched with a required driving voltage of the first driving coil circuit by providing an amount of series coupled LEDs of the LEDs of the first set of one or more LEDs to provide a forward voltage being equal to or larger than the required driving voltage of the first driving coil circuit.

4. The retrofittable LED lighting device according to claim 1, comprising a rectifier circuit coupled between the first power connection and the second power connection and the first output and the second output.

5. The retrofittable LED lighting device according to claim 4, wherein the first relay switch is coupled between the first power connection and the rectifier circuit or between the second power connection and the rectifier circuit.

6. The retrofittable LED lighting device according to claim 1, wherein the first relay comprises a second relay switch, wherein the first relay switch is coupled between the first power connection and the rectifier circuit and the second relay switch is coupled between the second power connection and the rectifier circuit.

7. The retrofittable LED lighting device according to claim 1, wherein the second driving coil circuit comprises a parallel combination of a second capacitor and a second resistor.

8. The retrofittable LED lighting device according to claim 1, wherein a forward voltage of the first set of one or more LEDs is matched with a driving voltage of the first driving coil circuit by providing an amount of LEDs of the first set of one or more LEDs to provide a forward voltage being equal to or larger than the driving voltage of the first driving coil circuit and wherein a forward voltage of the second set of one or more LEDs is matched with a driving voltage of the second driving coil circuit by providing an amount of LEDs of the second set of one or more LEDs to provide a forward voltage being equal to or larger than the driving voltage of the second driving coil circuit.

9. The retrofittable LED lighting device according to claim 1, wherein the first relay switch and the third relay switch are closed upon detection of a presence of a voltage and/or current at the first end and at the second end.

10. The retrofittable LED lighting device according to claim 1, wherein the first relay comprises a second relay switch, wherein the first relay switch is coupled between the first power connection and the LED load and the second relay switch is coupled between the second power connection and the LED load and wherein the second relay comprises a fourth relay switch, wherein the third relay switch is coupled between the third power connection and the LED load and the fourth relay switch is coupled between the fourth power connection and the LED load.

11. The retrofittable LED lighting device according to claim 1, wherein the first relay switch is adapted to be closed when a proper insertion of the retrofit LED lighting device in a retrofittable luminaire is detected.

12. The retrofittable LED lighting device according to claim 1, wherein the first set of one or more LEDs and/or the second set of one or more LEDs are evenly distributed between the first end and the second end.

13. The retrofittable LED lighting device according to claim 1, further comprising a third set of one or more LEDs coupled between the first set of one or more LEDs and the second set of one or more LEDs, wherein an LED density of the first set of one or more LEDs is higher than an LED density of the third set of one or more LEDs and/or an LED density of the second set of one or more LEDs is higher than an LED density of the third set of one or more LEDs.

* * * * *